(12) United States Patent
Wimsatt

(10) Patent No.: US 8,714,982 B2
(45) Date of Patent: May 6, 2014

(54) SYSTEM AND METHOD FOR TEACHING SOCIAL SKILLS, SOCIAL THINKING, AND SOCIAL AWARENESS

(76) Inventor: Casey Wimsatt, San Jose, CA (US)

(*) Notice: Subject to any disclaimer, the term of this patent is extended or adjusted under 35 U.S.C. 154(b) by 1477 days.

(21) Appl. No.: 12/252,111

(22) Filed: Oct. 15, 2008

(65) Prior Publication Data
US 2009/0097757 A1  Apr. 16, 2009

Related U.S. Application Data

(60) Provisional application No. 60/980,034, filed on Oct. 15, 2007.

(51) Int. Cl.
*G09B 19/00* (2006.01)

(52) U.S. Cl.
USPC .......................................................... 434/236

(58) Field of Classification Search
USPC ................................................. 434/236, 238
See application file for complete search history.

(56) References Cited

U.S. PATENT DOCUMENTS

| | | | |
|---|---|---|---|
| 4,341,521 A | 7/1982 | Solomon | |
| 5,386,999 A | 2/1995 | Rice | |
| 5,513,991 A * | 5/1996 | Reynolds et al. | 434/81 |
| 5,741,137 A | 4/1998 | Aduvala | |
| 6,186,145 B1 | 2/2001 | Brown | |
| 6,200,138 B1 | 3/2001 | Ando et al. | |
| 6,398,222 B1 | 6/2002 | Everett | |
| 6,422,871 B2 | 7/2002 | Shepherd | |
| 6,463,257 B1 | 10/2002 | Wood | |
| 6,570,555 B1 | 5/2003 | Prevost et al. | |
| 7,063,535 B2 | 6/2006 | Stamm et al. | |
| 7,065,711 B2 | 6/2006 | Hata et al. | |
| 7,182,601 B2 | 2/2007 | Donnan | |
| 7,217,133 B2 | 5/2007 | Thomas et al. | |
| 2004/0043373 A1 | 3/2004 | Kaiserman | |
| 2004/0212149 A1 | 10/2004 | Farmer | |
| 2006/0189886 A1 | 8/2006 | Jones et al. | |
| 2007/0117073 A1 | 5/2007 | Walker et al. | |
| 2008/0009772 A1 | 1/2008 | Tyler et al. | |

OTHER PUBLICATIONS

Tanaka, et al.; "Plasticity of the neural mechanisms underlying face processing in children with ASD: Behavioral improvements following perceptual training on faces"; University of Victoria & Yale Child Study Center; Document created prior to filing of U.S. Appl. No. 12/252,111; 1 page.

Klin, et al.; "The enactive mind—from actions to cognition: lessons from autism"; 2003 The Royal Society; 16 pages.

Simon Baron-Cohen—Director, Autism Research Centre University of Cambridge & Claire Harcup—Commissioning Executive, Culture Online; "Cultureonline—The Transporters (powerpoint presentation)" document created prior to filing of U.S. Appl. No. 12/252,111; 27 pages.

(Continued)

*Primary Examiner* — Kesha Frisby
(74) *Attorney, Agent, or Firm* — St. Onge Steward Johnston & Reens LLC

(57) ABSTRACT

A system for improving social skills and feature recognition including a user interface displaying an electronic image, the image including two or more features, software for visually amplifying a first portion of the image, software for visually partitioning the image into two or more second portions, software for visually quantifying the image, and software for animating at least one of the first portion and the second portions.

14 Claims, 14 Drawing Sheets

(56) References Cited

OTHER PUBLICATIONS

ASC—Animated Speech Corporation web Advertisement; "Launching Literacy with Timo"; Team up with Timo; Animated Speech Corporation (c) 2006; URL: http://www.animatedspeech.com/ [Retrieved Aug. 24, 2009]; 1 page.
Baby Bumblebee Web Advertisement; URL: http://www.babybumblebee.com/; Bee Smart Media Inc. (c) 2009; [Retrieved on Aug. 24, 2009]; 1 page.
Contact: Fred Baisini; Special Ed Connection; "Computer Games may Increase Emotional Awareness of Children with Autism"; URL: http://www.specialedconnection.com/LRPSecStoryTool/index.jsp?conten . . . ; LRP Publications (C) 2007; [Retrieved on Aug. 20, 2009]; 2 pages.
Accelerations Educational Software—Motivating the Mind web Adverstisement; DT Trainer Overview; URL: http://www.dttrainer.com/jos/content/view/12/741; Accelerations Educational Software (c) 2009; [Retrieved on Aug. 5, 2009]; 2 pages.
Micro Expression Training Tool (Mett) Online web Advertisement; URL: http://www.mettonline.com/; (c) 2007-2009 PEG All rights reserved; [Retrieved on Aug. 24, 2009]; 2 pages.
Second Life web Advertisement; URL: http://secondlife.com/whatis; Linden Research Inc; Dated Unspecified; [Retrieved on Aug. 24, 2009]; 2 pages.
IU News Room; "Study: Social Skills Programs for Children with Autism are Largely Ineffective"; http://newsinfo.iu.edu/news/page/normal/5877.html; [Retrieved on Jul. 31, 2009] (c) 2009 The Trustees of Indiana University; Jun. 25, 2007; 3 pages.
Institute of Education Sciences; Inquiries may be sent to: Dr. Kristen Lauer, Dr. David Malouf, Dr. Celia Rosenquist, Jacquelyn Buckley and Dr. Erin Caffrey; "Special Education Research"; URL: http://ies.ed.gov; May 24, 2007 and Sep. 6, 2007; 63 pages.
Teachtown web Advertisement; "Welcome to TeachTown: Computer Assisted Intervention for Autism and Language Disorders"; URL: http://web.teachtown.com; [Retrieved on Aug. 24, 2009] TeachTown, Inc. (c) 2001-2009; 2 pages.
The Aurora Project web Advertisement; URL: http://homepages.feis.herts.ac.uk/~comqbr/aurora/about/intro.html; Date Unspecified; [Retrieved on Aug. 25, 2009]; 3 pages.

* cited by examiner

901

SYSTEM AND METHOD FOR TEACHING SOCIAL SKILLS, SOCIAL THINKING, AND SOCIAL AWARENESS

CROSS-REFERENCE TO RELATED APPLICATIONS

This patent application claims the benefit of, under Title 35, United States Code, Section 119(e), U.S. Provisional Patent Application No. 60/980,034, filed Oct. 15, 2007, incorporated herein by reference.

FIELD OF THE INVENTION

The invention relates to teaching social skills, social thinking, and social awareness, and more specifically to a computer system and method for teaching social skills, social thinking, and social awareness to students of all ages with an Autism Spectrum Disorder.

BACKGROUND OF THE INVENTION

Children with an Autism Spectrum Disorder (ASD) find social interactions unusually challenging. Social skills challenges are common to everyone on the Autism Spectrum, and making an impact in the daily lives of autistic people has proven to be a challenge that requires innovative thinking and technology. Autistic people often have an affinity for technology. This system and method helps improve social interactions and relationships and further improves social skills of the users.

A common task shared by parents, teachers, and physicians alike is to encourage students with an ASD to put social skills to use in real life situations—what in the field is called "generalization." Researchers are constantly searching for ways to improve generalization among individuals afflicted with learning disorders. Some software tools have been developed to assist with the treatment of autism, but there has still been little success in achieving generalization. Without being able to use the skills in everyday life, students with an ASD are faced with increased social challenges. It is therefore desired to provide this innovative method of teaching social skills in order to promote generalization.

SUMMARY OF THE INVENTION

It is an object of the present invention to provide a system including software to teach social skills and feature and/or facial recognition that is effective in real life situations and provides for generalization.

It is a further object of the present invention to provide methods and techniques to promote the learning, generalization, and maintenance of verbal and/or non-verbal social skills in children and adults. In particular, it is an object to provide such methods and techniques for people with pervasive development disorders, such as ASD, and people with an attention deficit disorder, and people with other disorders who may have difficulties putting social skills to use in real life situations what in the field is called generalization. This invention helps users become aware of and understand the intrinsic social value of paying attention to facial movements.

The methods of the present invention promote the learning of children and adults, including, but in no way limited to, four-year old neurotypical children preparing for elementary school, and/or adults and children with a Pervasive Development Disorder, such as an Autism Spectrum disorder, and/or people with an Attention Deficit Disorder. The software according to the present invention creates several games aimed at improving visual perception of students, especially awareness of and understanding personal significance to certain facial features and movements, particularly around the eyes. Studies and anecdotal reports have shown that people with an ASD focus more on the mouth than the eyes, if on the face at all. Perceived images include pictures of human faces strategically animated to improve the student's understanding with every new question. The software allows the student to become aware of and understand there is some intrinsic social value to paying attention to facial movements, particularly around the eyes, including subtle and fleeting movements in addition to broad poses, identify various facial features, and recognize faces by remembering local facial visuals and geometry, such as a prominent eyebrow, all elements vital to improving social skills.

In addition to the improving visual perception, the software and methods according to the present invention may use an approach to teaching reminiscent of a "Montessori" or "Constructionist" approach or an embodied cognitive science approach, where in the case of the present invention, through participating in a structured social experience, the student discovers an intrinsic value in paying attention to non-verbal cues, such as movements around the eyes. This "guided self-discovery" is believed to be more neurologically activating and also, most importantly, most readily used in novel situations in everyday life. Conventional programs in this area appear to take the opposite approach, presenting, explaining, and through repeated and stimulating quizzing, helping the student memorize catalogues of social skills. These programs may lead to some degree of intellectualization, but no generalization for everyday life. The "Montessori" approach employed by the method further improves the user's social skills and promoting generalization.

Other objectives are achieved by providing a system for improving social skills and feature recognition including a user interface displaying an electronic image or images, the image including two or more features, software for visually amplifying a first portion of the image, and software for quantifying the image through a variety of means, including juxtaposition of changed partition sections next to unchanged partition sections or by adding linear elements such as a complete border around at least one line across the section or by emphasizing linear elements such as an eyebrow, such that changes in the image section can be visually assessed and compared relative to other sections or relative to stationary partitions. In this invention the other sections include lizard skin cell borders that change with the image of the skin, and stationary partitions include whisker partitions that appear stationary relative to the skin, eyebrows enhanced to look more linear, and horizontal stationary lines. The system also includes software for visually partitioning the image, particularly the high-traffic and low-attention regions around the eyes, into two or more second sections, and software for animating at least one of the first portion and the second sections.

In preferred embodiments, the image includes a human face, and wherein the features include facial features. The software for visually amplifying may display one or more cells of the human face in the first portion. The software for visually partitioning may display two or more partition lines on the human face, or an array of three or more partition lines on the human face, crucial for discriminating between subtle differences in expressions. The system may also include software for visually blocking a non-animated portion of the human face.

In some embodiments, the system includes an input mechanism, the input mechanism receiving a user selection indicative of an animated feature. The input mechanism may be, for example, a mouse or a touch screen. In some embodiments, the input mechanism is a voice recognition system. In other embodiments, the eye, head, and body movements of the user may also be used for input, as well as live video of the user.

The system according the present invention preferably includes software for providing audio output. For example, audio output may include feedback in response to a user selection indicative of an animated feature, first portion or second portion. The audio output may also be voice commands to a user for the purpose of playing a game. In a preferred embodiment, the software will use a synthesized voice and engage the user in a simulated dialogue and social interaction, including stating the user's name, describing an action the user just performed, or another character the user just helped. Visual and audio instructions and feedback may also be provided to the user. In one preferred embodiment, the audio will be spoken by photo-realistic talking characters, which include facial expressions, mouth movements, and lip-sync to audio speech, whether recorded or synthesized.

Other objects of the present invention are achieved by provision of a method to improve social skills and feature recognition, the method including the steps of providing an image of a human face, visually amplifying one or more first portions of the image, visually partitioning one or more second portions of the image, displaying the image, quantifying the image, animating at least one of the first and second portions of the image, and receiving a user response.

In some embodiments, the method further includes the steps of removing the partition lines, animating at least one portion, and receiving a second user response indicative of the animated portion.

The method may also include the step of visually blocking a third portion of the image. In some embodiments, the method further includes the steps of physically reenacting the step of animating, and receiving a user response indicative of the physically animated portion.

In some other embodiments, the method further includes the steps of displaying a plurality of second images circumscribing the human face, wherein the animated portion includes areas around the eyes of the human face, and wherein the user response is indicative of one of the second images towards which eyes are directed.

In some embodiments, the present invention provides a method for guided self-discovery, through visual observation and social participation, first in a predictable, comfortable environment and gradually in more realistic and uncontrolled environments, where the user is guided to discover physical details that may not otherwise be noticed, preferably discover some simplifying physical patterns about those physical details that the student can apply to recognize and analyze most known and undiscovered occurrences of the physical details, and finally discover an association between social interactions and relationships that are intrinsically valuable to the student and observing and attending to physical details and patterns.

Other objects of the invention and its particular features and advantages will become more apparent from consideration of the following drawings and accompanying detailed description.

DETAILED DESCRIPTION OF THE INVENTION

Figure 1:
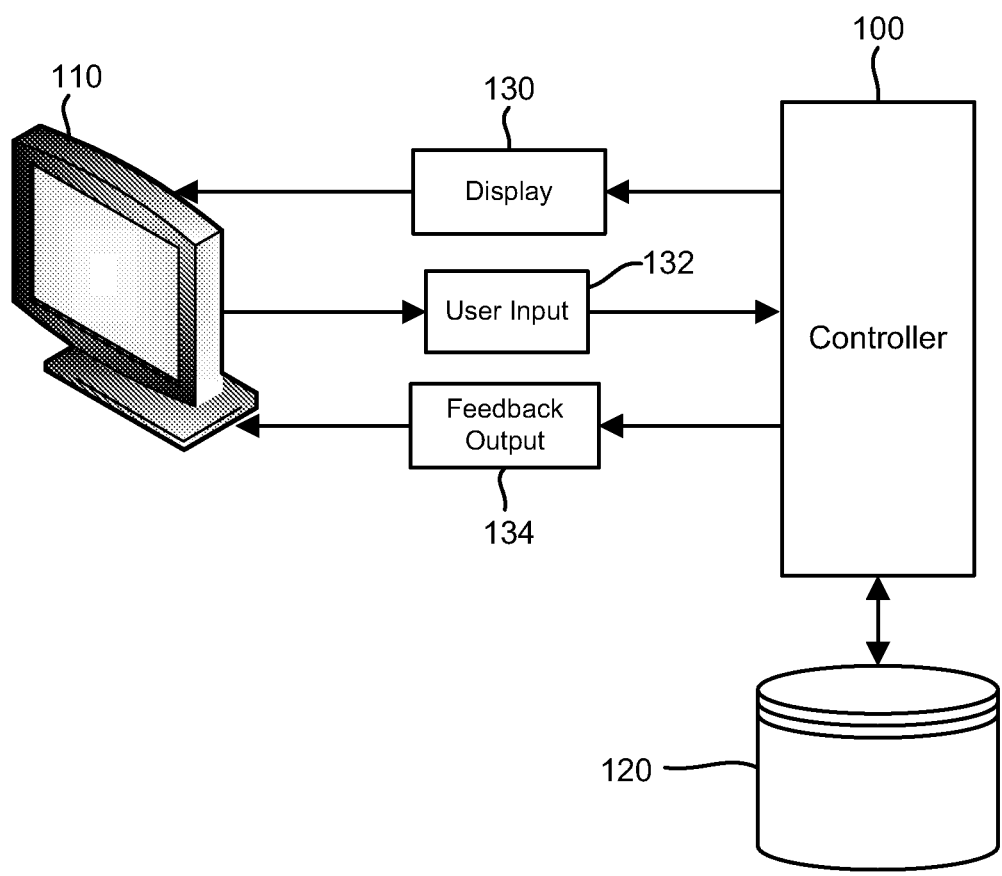
FIG. 1 is a schematic diagram of a system according to an exemplary embodiment of the present invention.

The present invention provides a system and method for teaching social skills serves as a learning tool for individuals with autism or other developmental disorders. The system and method serves as a learning tool for individuals with autism or other developmental disorders. In one exemplary embodiment, the learning tool is an interactive computer game introducing elements of improvisation and ambiguity into the target social interactions in the virtual environment/situation. The instructional method employed by the present invention facilitates generalization by bridging his/her level of mastery and/or comfort from a starting point in a comfortable "more controlled" virtual setting, and through game functions, extending by stages further and further towards the "less controlled" real life settings. In one exemplary embodiment, the present invention provides a game that focuses on an awareness of the physical anatomical movements which encourage students to accomplish some level of mastery in the domain and hence comfort with undertaking the more ambiguous and challenging task of assigning meaning to those movements. The game in turn improves the user's social skills by helping the user make better and more strategic use of his or her specialized and visual perception. The present invention redirects existing specialized visual perception to point to obscure facial areas and to turn the "local v. global" deficit into an advantage, focusing on smaller and either high-traffic areas or features valuable for recognition. The game's software produces several various challenges for the user, which in turn improve the user's social skills.

The present invention may be implemented in a variety of ways. In a preferred embodiment, the present invention includes a system for improving social skills and recognition embodiment in a software based game. The games can, in some cases, be played independently by a student, allowing the student to work on social skills when others are not available to participate in live social interactions and/or when s/he may not feel up to live social interactions. The system provides a social experience including characters talking to user by name and the user participating as part of the experience, where the experience is geared towards a real life social games or social play or helping situation.

This system incorporates an interface designed to communicate with the user using various audio and visual signals. The interface displays at least one electronic image for the user. The image may, for example, be a static image or a video, an animation sequence, an animation data file, live video feed, etc. The image contains or displays at least two features. The image is visually amplified, partitioned, and animated by a software program. In some embodiments, the software program is coded in Visual Basic. The software also provides for audio and video output in order to pose questions and give feedback to the user. The user interface then utilizes one of its inputs for receiving a user selection of an animated one of the partitioned portions and awaits a response from the user. After receiving a response indicative of the user's visual perception of the animated portion, the interface transmits feedback to the user indicative of the accuracy of the user's perception, replaying a question in case of an incorrect response. Aiding the interface in this process is a system database which contains actual user inputs, expected user inputs, and user-configured settings. In some embodiments, the system continually loops an individual question until it the user provides the correct response. The session continues until all questions are answered correctly. Each session contains about twenty to thirty questions.

The software of the invention issues audio commands for the purpose of playing a game and audio feedback to the user corresponding to the user's input. After typing in a name, the system utilizes a text-to-speech system to vocally output the name throughout the game. During the game, an animated image, which moves its mouth to appear to be talking, issues voice commands. In order to play the game, the user listens to the dialogue spoken by an animated image and observes an animated image of a puppet that gives an instructional demonstration, including where to click or drag the cursor. After every user response, the software may generate an affirmative or negative audio remark, depending upon whether the user was correct. The audio remarks are made simultaneously with the animation of the mouth of the facial image, allowing for the user to learn facial signals concerning feedback. The feedback may also include stating the user's name. In some embodiments, the system gives non-verbal feedback such as a wink or other facial signal or gesture.

In some exemplary embodiments, the user interface displays a digitally-photographed image which includes a human face and corresponding facial features. A camera may also be used to take an image of the user for use in the system and game. In addition, the software for visual amplification displays one or more lizard-like cells of the human face, while the software for visual partitioning is able to display multiple partition lines on the human face. The image is not included only as a static picture, but can be turned into a special model that can be rendered dynamically into a photorealistic video simulation incorporating the user and his or her instructors, classmates, family or friends. Amplified and animated features include areas around the eyes and the face in its entirety.

Amplifying, partitioning, and quantifying the image, such as a face, may make the face less confusing and/or overwhelming to the student. For example, the student may find it more manageable to focus on the area within and/or near a section or partition of their choice and/or sub areas within one such section, rather than to try to track movements on the whole face. Amplifying or highlighting portions of the face to focus on an awareness of even the small physical movements, including, by way of example, small changes in the facial skin/features/muscles associated with a small change of intensity of an expression, helps others modulate their expression. Under the theory of central coherence, students with an ASD have stronger local visual perception as opposed to global visual perception. Additionally, using video mirror to compare a real self to animated self helps the student modulate his or her own expressions.

Figure 2:
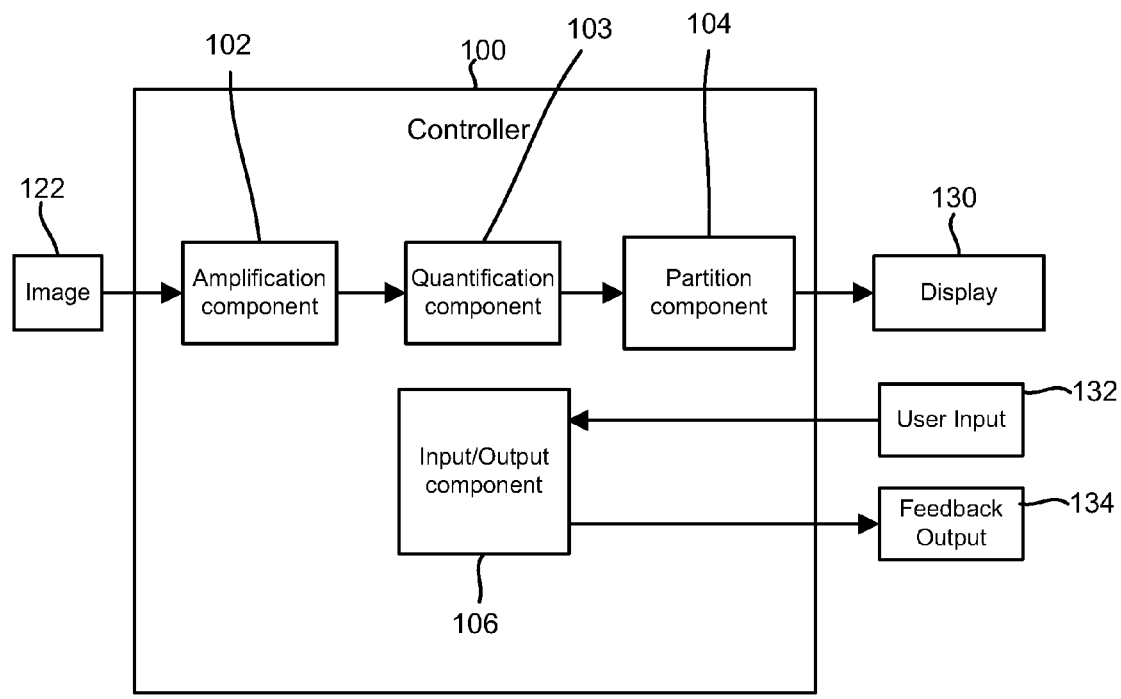
FIG. 2 is another schematic diagram of the system shown in FIG. 1.

FIGS. 1 and 2 illustrate a system according to an exemplary embodiment of the present invention. The system includes software for receiving user input and transmitting output, as well as software to amplify and partition images, and software to let the student participate in a pleasant simulated social interaction. FIG. 1 is a schematic diagram of a system according to an exemplary embodiment of the present invention. The figure displays a user interface 110 which displays an electronic image, the image including two or more features. The user interface 110 may be, for example, a user interface of a personal computer making the system convenient for use in at-home therapy and/or in a classroom setting. The software may be stored locally, or delivered via the internet. The user interface 110 may also be a monitor or television wherein the system is embodied in a console gaming system or interactive DVD. The lizard skin and whiskers could also be applied to other media to direct attention to and provide greater facility with facial movements around the eyes.

The display 130 includes the image controlled by software which visually amplifies a first portion of the image, visually partitions the image into two or more portions, and animates at least one of the first portion and the second portions. The user enters input 132, which software executing on the controller 100 evaluates for correctness. For example, the software may access the database 120 containing expected user inputs. Feedback 134 is then displayed on the user interface 100.

FIG. 2 is another schematic diagram of the system shown in FIG. 1, specified with the function of an image 122. The controller 100 takes an image 122 and applies four software components: amplification 102, quantification 103, partition 104, and input/output 106. The software and images may be stored in the program database 120, locally or remotely and accessed via a communication network. The controller 100 takes the image 122 and amplifies certain features of the image, quantifies the image, and then partitions them based on the stage of the game the user is playing. The amplified, quantified, and partitioned image is then displayed 130 to the user. Upon viewing the image, the user enters input 132 to answer the question posed by the controller 100. The input/output component 106 then evaluates the user's input and verifies its correctness. The controller then issues output 134 indicating whether the user was correct.

Figure 3:
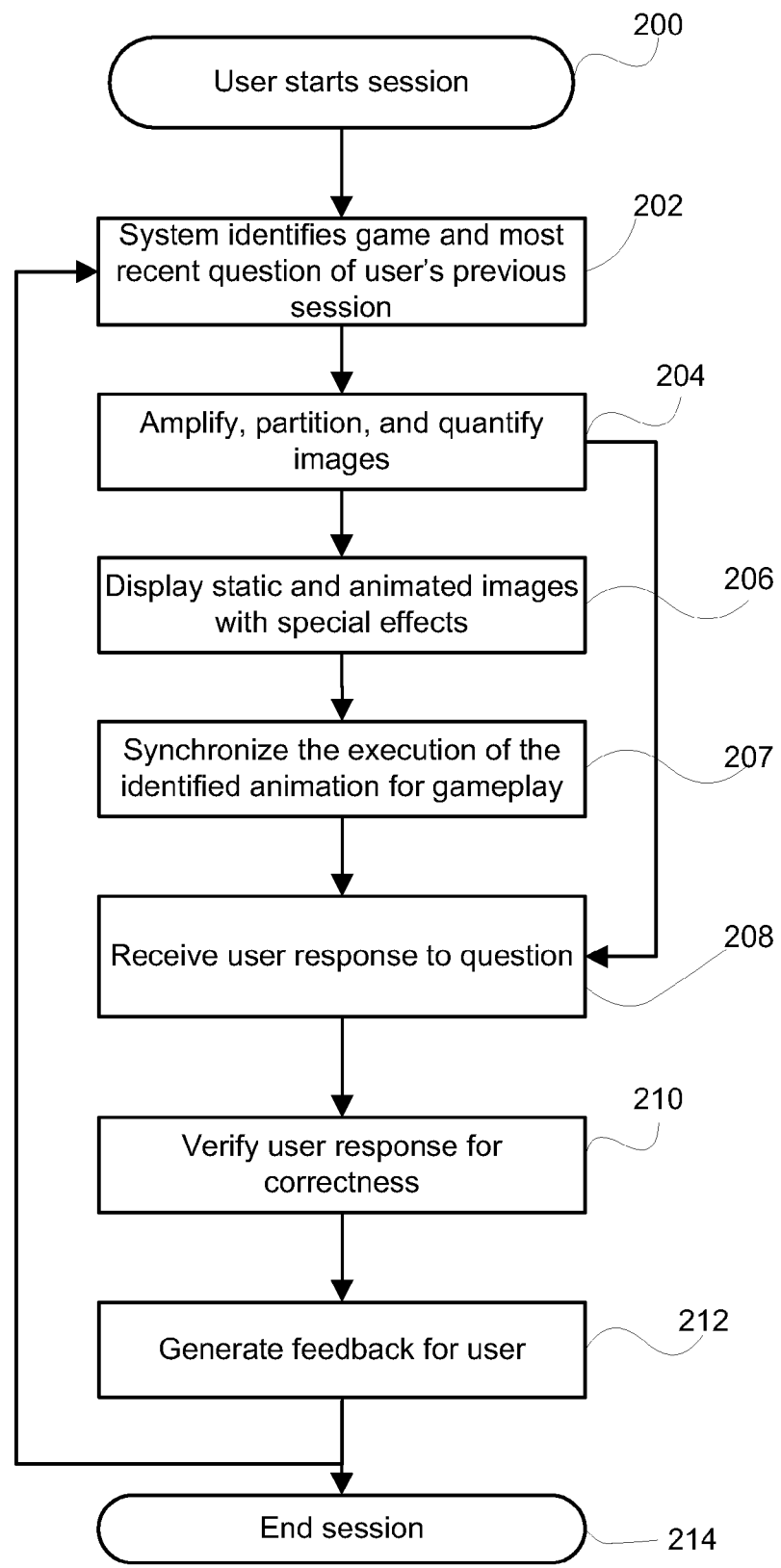
FIG. 3 is a schematic diagram of a method according to an exemplary embodiment of the present invention.
Figure 4:
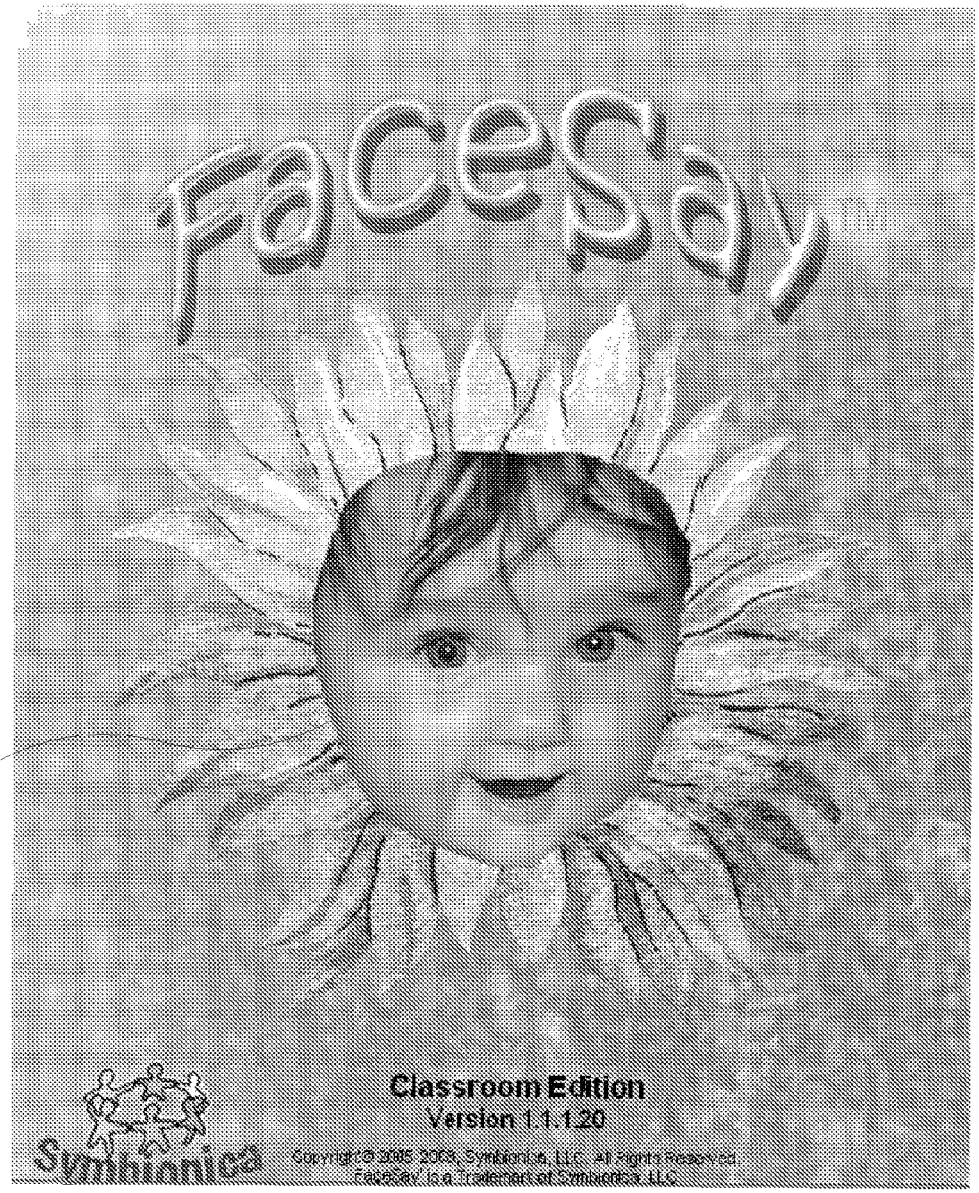
FIG. 4 is an image displayed at the introduction of a game generated by the system shown in FIGS. 1 and 2.

FIG. 3 is a schematic diagram of a method and/or software routine of the system shown in FIG. 1. While the method is described in the context of a software system, it should be understood that the method according to present invention may be carried out by other means, such as by using live actors and props. FIG. 3 illustrates the function of the interactive software. Upon entry into the game, the system identifies the last question presented to the user and the appropriate game 202. At that point, the software serves to amplify, quantify, and/or partition 204 the relevant images 204. The system then displays 206 said images, incorporating animation and special effects where necessary. To facilitate gameplay, the system interacts with the user by synchronizing 207 the execution of the animation. The system then receives 208 the user response to a question and verifies 210 the response for correctness. The software then gives feedback 212 to the user, whereupon a new question is presented, the same question is repeated, or the session terminates 214. If a new question is presented, or the same question must be repeated, the routine loops back to identifying the proper game and posing the appropriate question 202.

The system according to the present invention provides a plurality of exercises or games that may be played via the user interface 110. FIGS. 4-13 illustrate several exemplary user interfaces and displays of the games provided by the present invention. Each game has a "stage" which includes one or more animated images serving as actors responsible for controlling gameplay, providing verbal instructions and feedback, and helping to simulate a social experience. There are also one or more interaction points on the stage to allow the user to enter a response based on a question concerning the actors on the stage. Each actor may wear a mask in order to increase the educational level for the user, and to amplify small physical movements in a social gesture. In addition, each game has an "orchestra pit" which includes actors responsible for coaching the user and issuing feedback.

An image of a baby on the lower left portion of the orchestra pit offers help when requested, and an image of an animal on the lower right gives commands and feedback. While some exemplary images are shown, the invention can be readily adapted to promote generalization and maintenance for people with different social experiences, including, young children, adolescents and adults, either neurotypical or on the autism spectrum. For example, the scenery, props and characters can include talking babies and cute animals (kittens, guinea pigs, etc) for younger children and talking adults and more exotic animals (Gorillas, Lions, etc) for older children and talking peers and/or famous historical figures in their field of interest for adults.

Figure 5:
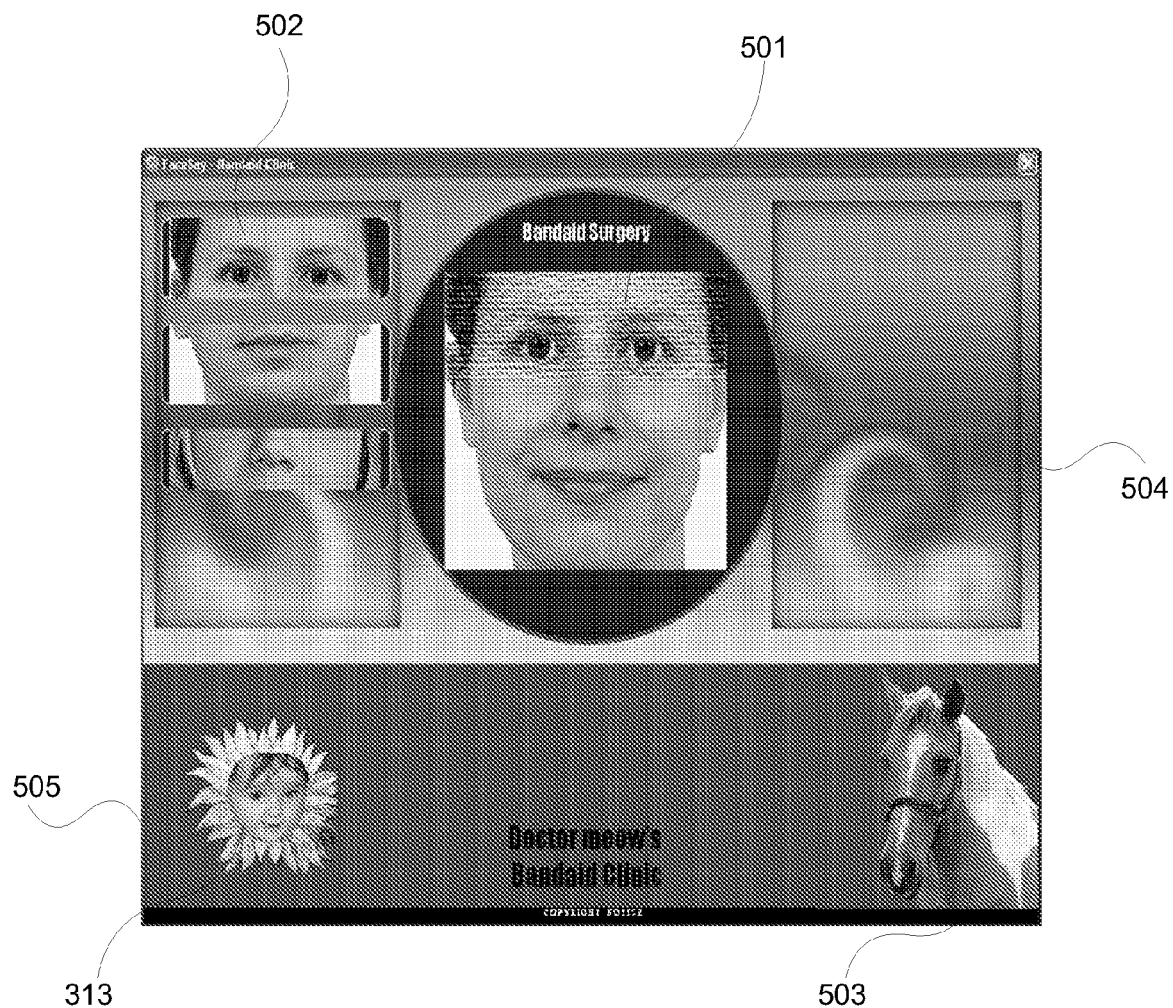
FIG. 5 is an image displayed during a game generated by the system shown in FIGS. 1 and 2.
Figure 6:
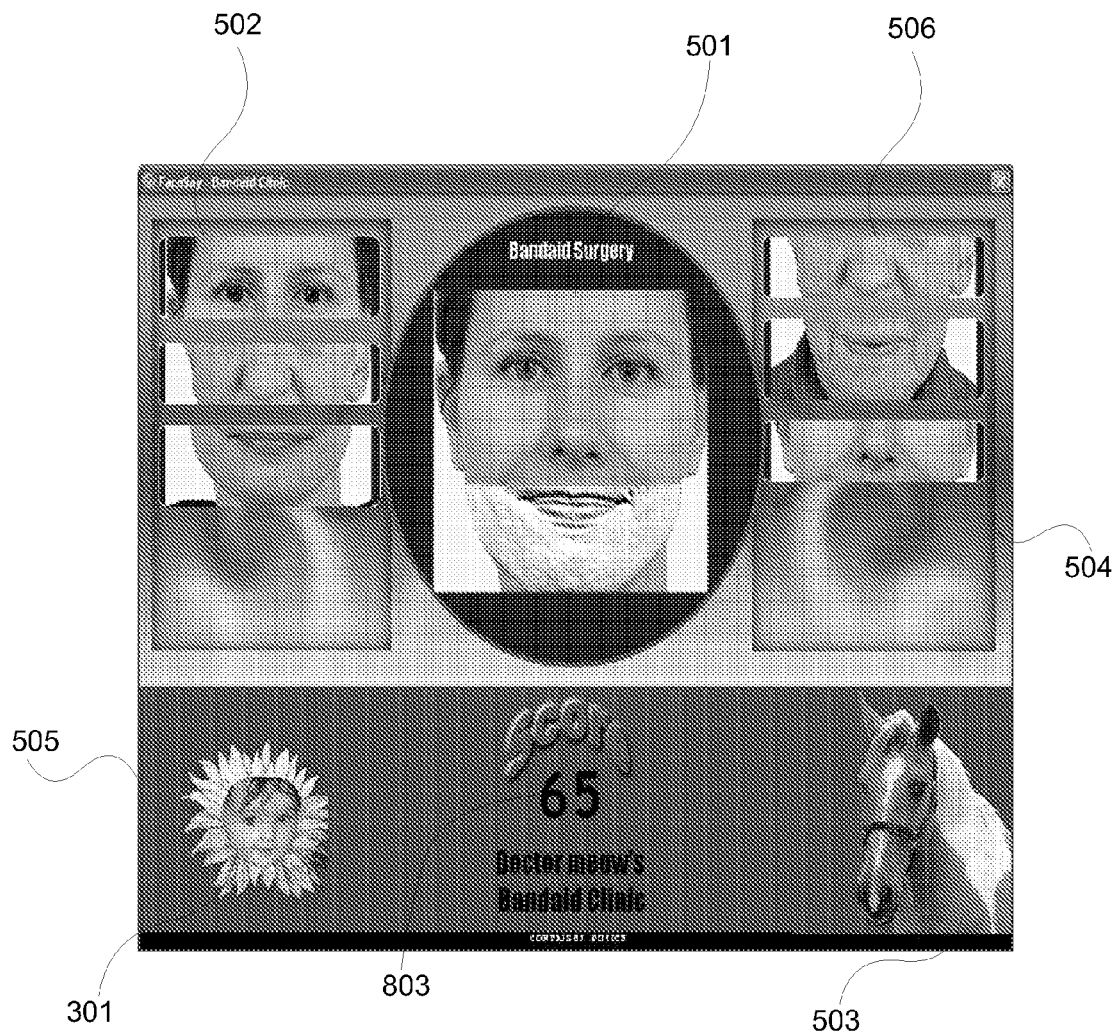
FIG. 6 is an image displayed during a game generated by the system shown in FIGS. 1 and 2.

An exemplary game is "Bandaid Clinic." In "Bandaid Clinic," shown in FIGS. 5 and 6, the user is shown an animated image of a face 501 on the stage 504, with the eyes, the nose, or the mouth distorted. In the orchestra pit 505, an image of a horse 503 and an image of the baby 313 commands the user to select the facial image 502 that best completes the animated face. In the first session, shown in FIG. 5, the user has three options; in the second session, shown in FIG. 9, the user has six options. If the user does not select the correct facial component, the game commands the user to try again. Once the user completes two sessions of "Bandaid Clinic," he or she advances to play "Follow the Leader."

FIG. 5 is an image displayed at the introduction of the second subroutine of the user interface of the system shown in FIGS. 1 and 2. In the orchestra pit, a horse image 503 describes the "Bandaid Clinic" game to the user. As part of the "Bandaid Clinic" game, the facial image 501 is partitioned into three parts: eyes, nose, and a mouth. In some embodiments, the amplification includes distorting or stretching the face. This approach helps reduce the many possible facial motions to a few simple and observable physical principles. Actions such as stretching and compressing of facial features allow users to better understand social skills and improve generalization. The user plays the "Bandaid Clinic" game by selecting one of the partitioned portions 502 to complete the image of a face. The input mechanism receives the user's input, and the controller 100 verifies its correctness and dispenses feedback to the user. The feedback is given to the user from the baby 313 and horse 503, both of which are animated. The feedback includes introduction to a new question, transition between questions, encouragement, and praise. A scoreboard 803 keeps track of correct responses.

FIG. 6 is another image displayed by the system shown in FIG. 1. After completing the first subroutine of questions including images shown as in FIG. 5, the user interface displays images as shown in FIG. 6. Continuing the "Bandaid" game, the user plays the game by selecting one of the partitioned portions on the left 502 or one of the partitioned portions on the right 506 to complete the image of a face 501.

In "Follow the Leader," shown in FIGS. 7-13, a talking zebra 804 acts as a referee in the orchestra pit 808. After the baby image 802 commands the user to click on the zebra, the user is introduced to two face images. Both images 708, 709 on the stage 809 are animated at the area around the eyes and face, and the user must decide whether both faces, although of different people, are making the same expression. The system and interface use an input mechanism for receiving a user input indicative of a difference between the two human faces. If the user is incorrect, the game commands the user to try again with the same two faces and the same expression until successful. This session is continued with partition lines, in the form of whiskers, and brick walls to cover the mouths. The whiskers and brick walls blend into the game so as to minimize distraction for the user. The object of the game, a multi-person virtual social experience, is to improve the user's visual discrimination skills using "mirroring" and "modulation."

Figure 7:
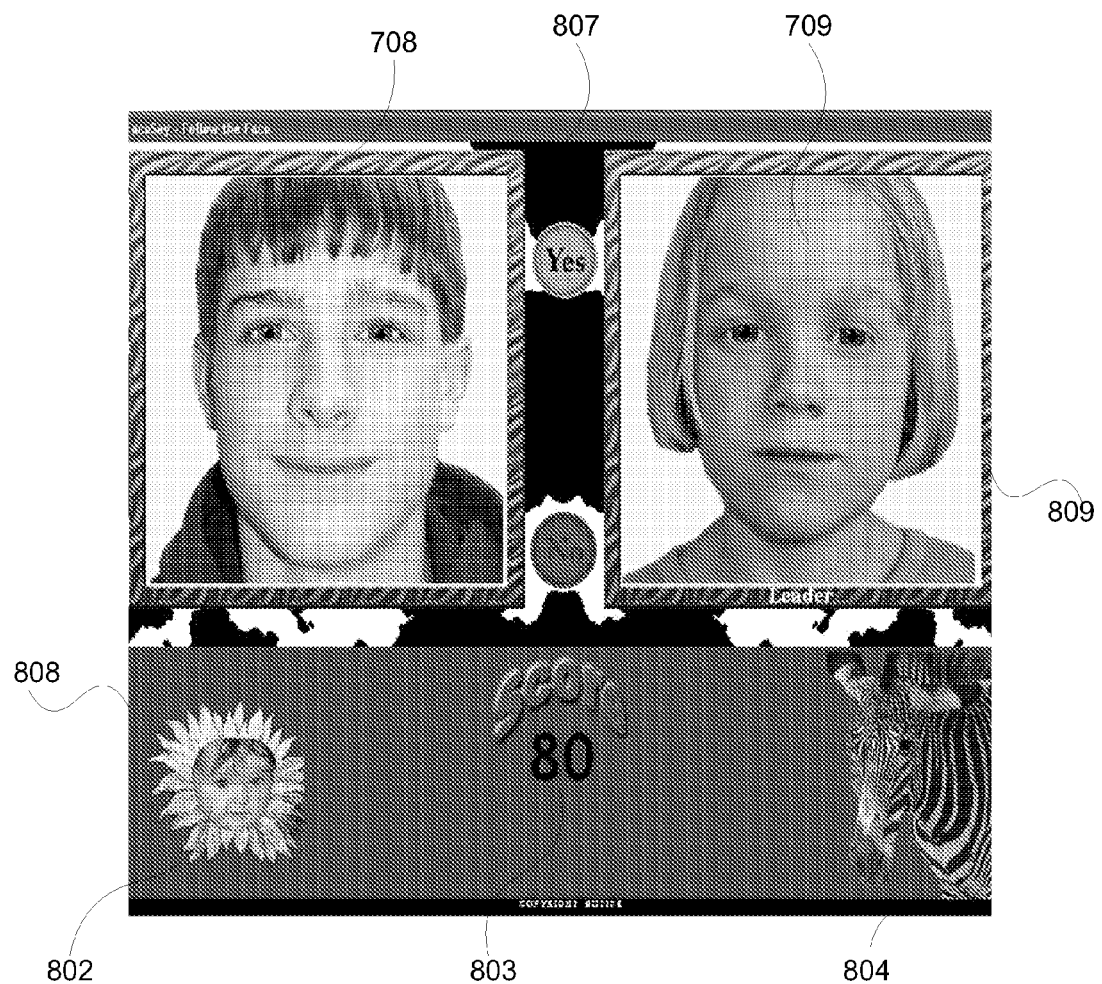
FIG. 7 is an image displayed during a game generated by the system shown in FIGS. 1 and 2.

FIG. 7 is an image displayed at the introduction of the third subroutine of the user interface of the system shown in FIGS. 1 and 2. In the orchestra pit, a zebra image 804 describes the "Follow the Leader" game to the user. The baby 802 provides help upon request. As part of the "Follow the Leader" game, two facial images 708 and 709 are displayed to the user. The user gives input to the user interface by clicking a button 807 dependent upon the user's visual perception of the two facial images. The input mechanism receives the user's input and the controller verifies its accuracy and dispenses feedback to the user as to whether the response is correct. Feedback is given by the zebra 804, which is animated and produces audio responses. The feedback includes introduction to a new question, transition between questions, encouragement, and praise. If the user enters an incorrect response, the controller requests another response from the user, until the user enters the correct response. A scoreboard 803 keeps track of correct responses.

Figure 8:
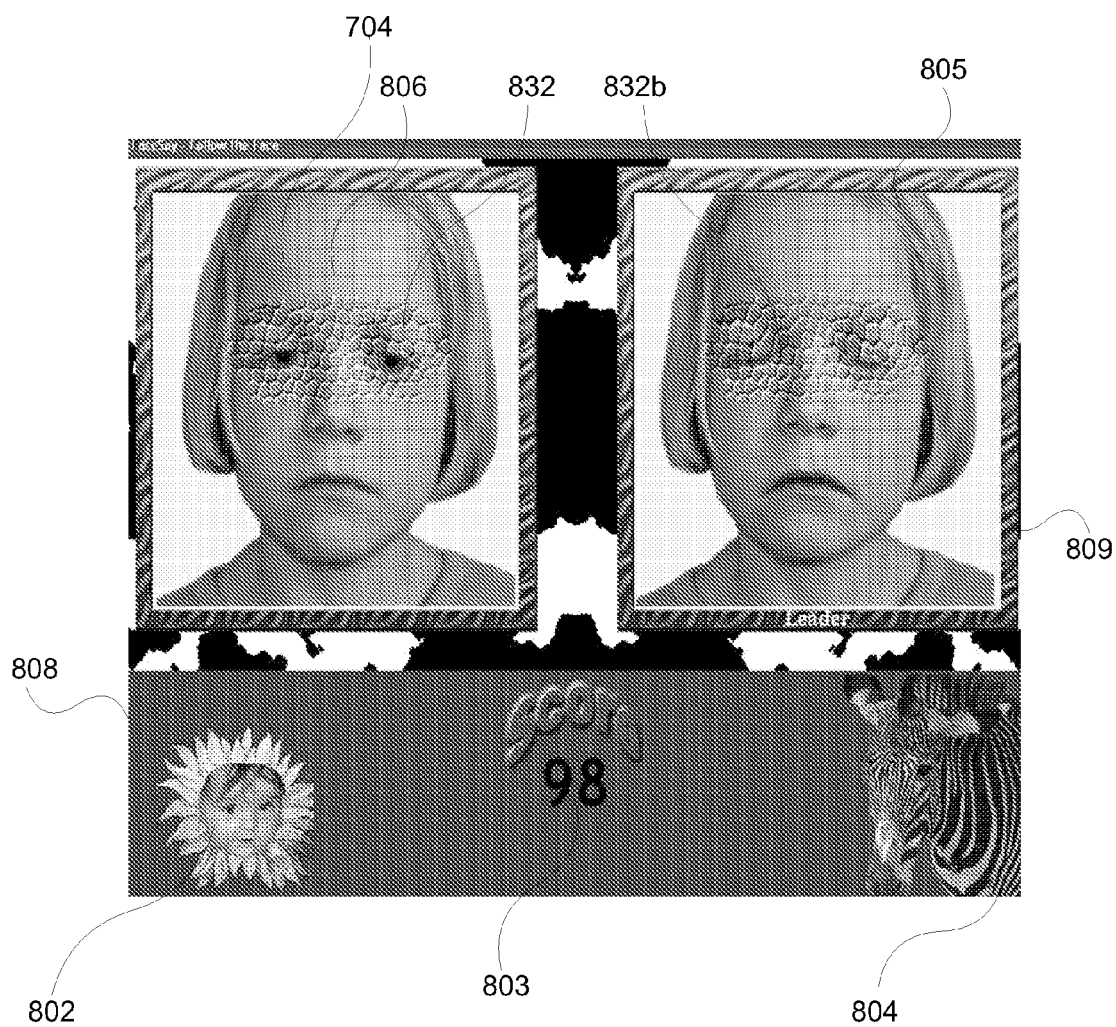
FIG. 8 is an image of animation of eyes displayed during a game generated by the system shown in FIGS. 1 and 2.

FIG. 8 is an image of animation of the area around the eyes displayed during the third subroutine of the user interface of the system shown in FIGS. 1 and 2. Two faces 805, 806 on the stage 809 are perceived by the user in a continuation of the "Follow the Leader" game. In this game, the area around the eyes is covered in a lizard-skin mask 832 that appears to be on the "surface" of the skin, and that stretches and compresses as the morphing software animates the facial expressions and movements, and thereby helps to amplify, quantify, and localize the image for the user. The cells 832b are small skin regions with borders that stretch and compress as the morphing software stretches and compresses to simulate the larger facial expression. The visual effects, such as the stretching and compressing of the lizard skin cells 832b, or the raising of an eyebrow above or below a stationary horizontal line, allow the user to quantify the degree of movement, and granularity in proportion to other movements. At the introduction, the arrow 704 helps the user determine how to animate the area around the eyes. The user visually perceives the two images and receives the audio command to animate one of the images. The command comes from the zebra 804, and help is available upon request from the baby 802. Both the zebra and the baby are located in the orchestra pit 808. The user, after receiving the command, must click and drag the arrow 704 on image 806 in order to match the expression of the cells 832b on image 805. If correct, the user will receive a new question; if incorrect, the user will attempt the same question again, continuously until correct.

Figure 9:
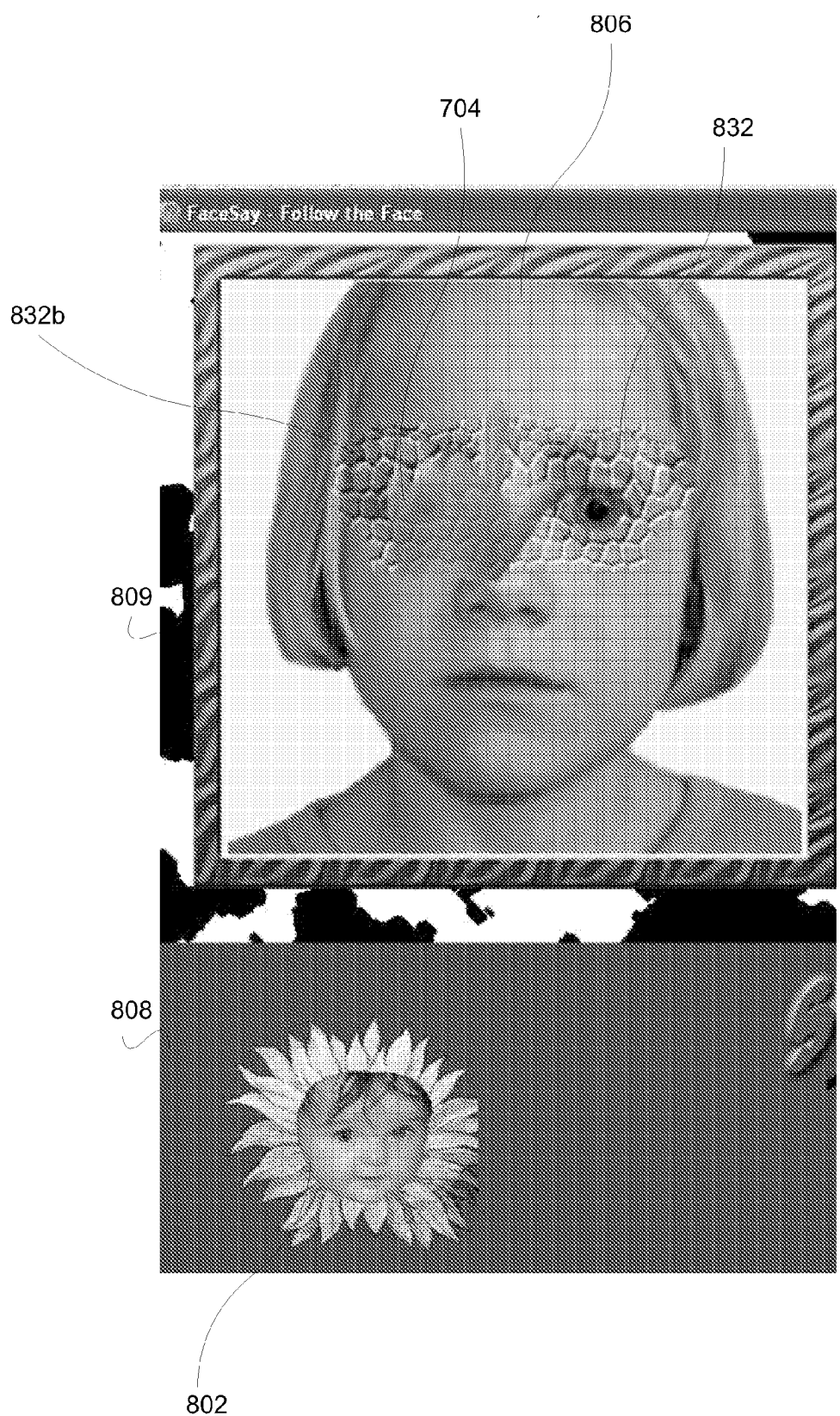
FIG. 9 is an image of user-controlled animation of eyes displayed during a game generated by the system shown in FIGS. 1 and 2.
Figure 11:
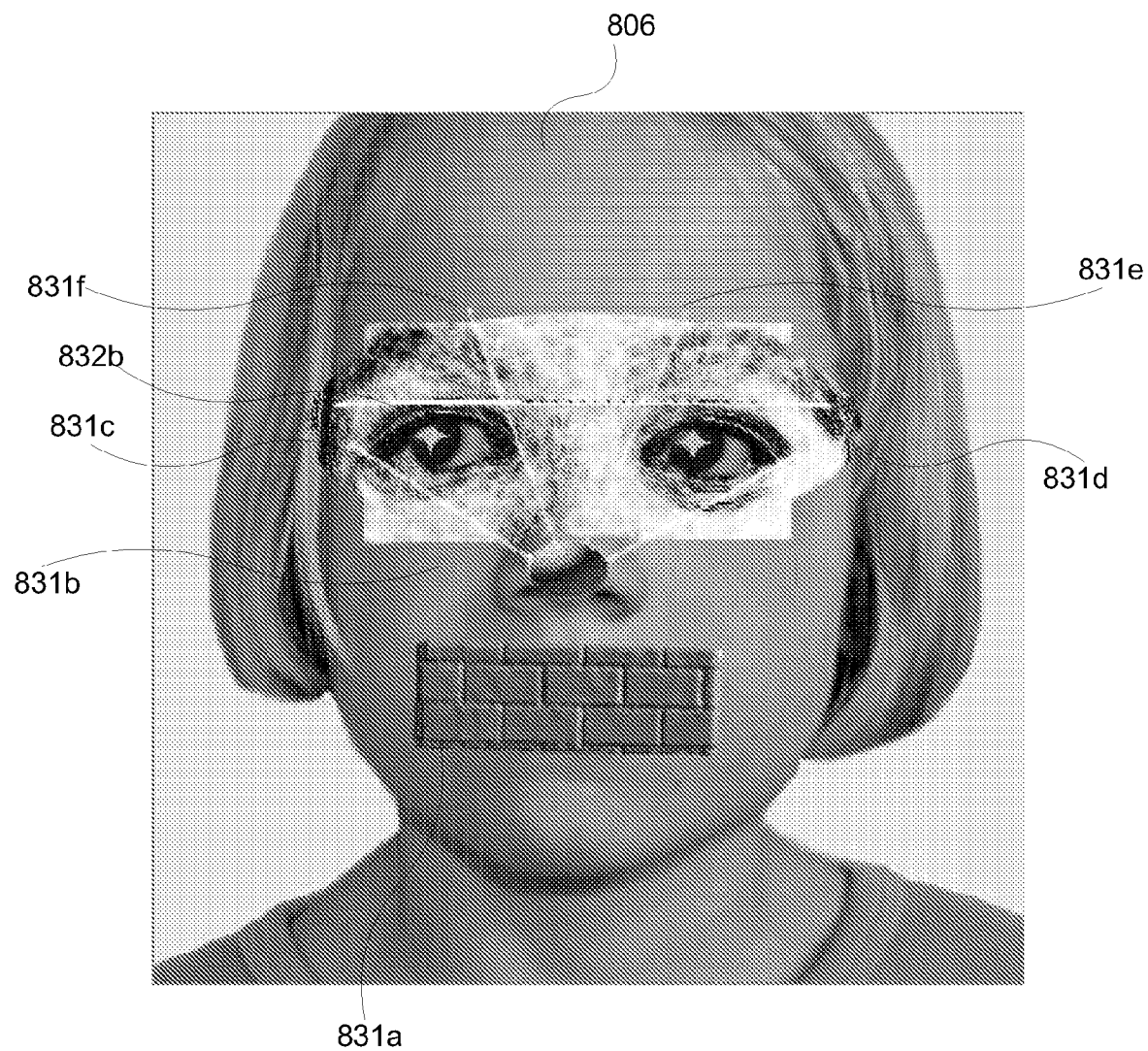
FIG. 11 is an image of a face with whiskers covering eyes and a brick covering a mouth on a face displayed during a game generated by the system shown in FIGS. 1 and 2.
Figure 12:
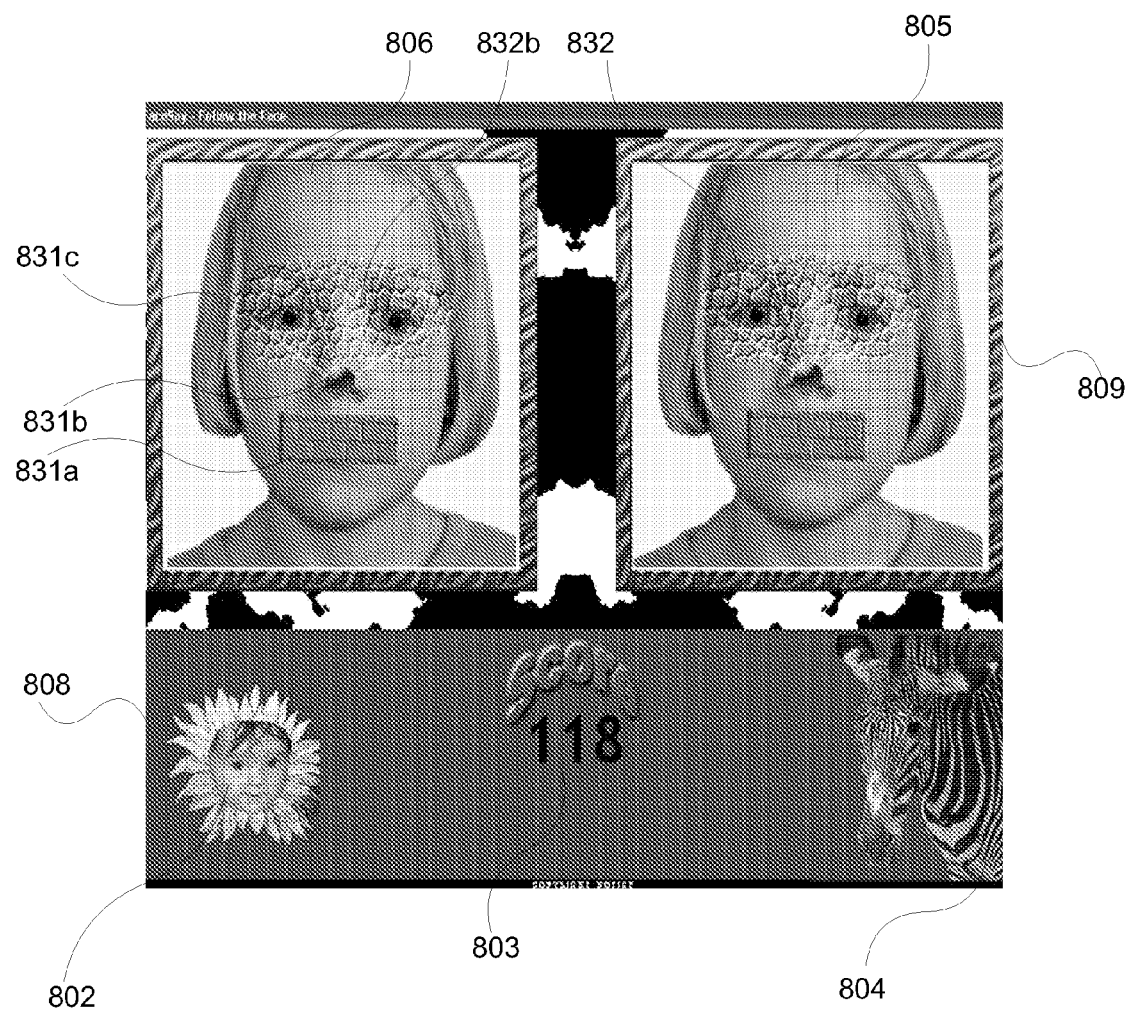
FIG. 12 is an image of animation of areas around the eyes and brick walls covering the mouths on faces displayed during a game generated by the system shown in FIGS. 1 and 2.

The final stage of the Follow the Leader game, shown in FIG. 9, involves user-controlled animation, whereby the user clicks and drags the face 806 up or down in order to match the computer-animated image. The user looks at the face on the right, and then drags a spot of the image 806 on the left such that the resulting animation will make the faces appear identical. Partition lines, in the form of whiskers, are also introduced during latter stages of the game, as shown in FIGS. 11 and 12. The whiskers enclose three discrete areas within which the facial movements involved in approximately 90% of the emotions can be detected (e.g., high traffic areas). The white lines of the whiskers move with the head, but do not morph with the skin, so they also serve as a "ruler" against which the stretching "cells" 832b can be compared.

In another exemplary embodiment, the user's face is used in the "Follow the Leader" game. The user can animate from a digital photograph of himself or herself or upload the digital photograph to be animated, both approaches using third party tools to create an animation model file which can be used to supplement or replace the original characters included in the games. After the user accomplishes this feat successfully, a live video can be taken of the user and displayed on the screen in the position of the follower 805, such that the user can change his or her expression in real time, trying to match that of his animated image on the right, while viewing said live video on the screen. In another variation, a single the interface displays virtual animation in the middle of the screen composed of two animation sources: the left half composed of the left half of the live video of the user's left half of his or her face, and the right half composed of the right half of the animation sequence of the user's right half of the face performing the target facial movements, with the user guided to align the two by lining up a simple red dot on his or her nose with a proportionally scaled dot on the animated self's nose.

FIG. 9 is an image of user-controlled animation of the area around the eyes displayed during "Follow the Leader," the third subroutine of the user interface of the system shown in FIGS. 1 and 2. A face 806 with eyes is displayed. The user interface requests the user to animate the area around the eyes in the lizard skin 832 through clicking at a certain point 704 on the image. The skin mask 832 amplifies facial features to highlight even small physical movements in a social gesture. The face of the actor 806 makes movements corresponding to the clicking and dragging. Each movement serves to teach the user the movements associated with a human face. The animation allows the user to learn the transition from one facial expression to another. In this portion of the game, the user must animate the face 806 to match another face. The controller then indicates to the user whether the user's animation of the image was correct. If incorrect, the controller requests the user to animate the image again, until the user animates the image correctly. A scoreboard 803 keeps track of correct responses.

Figure 10:
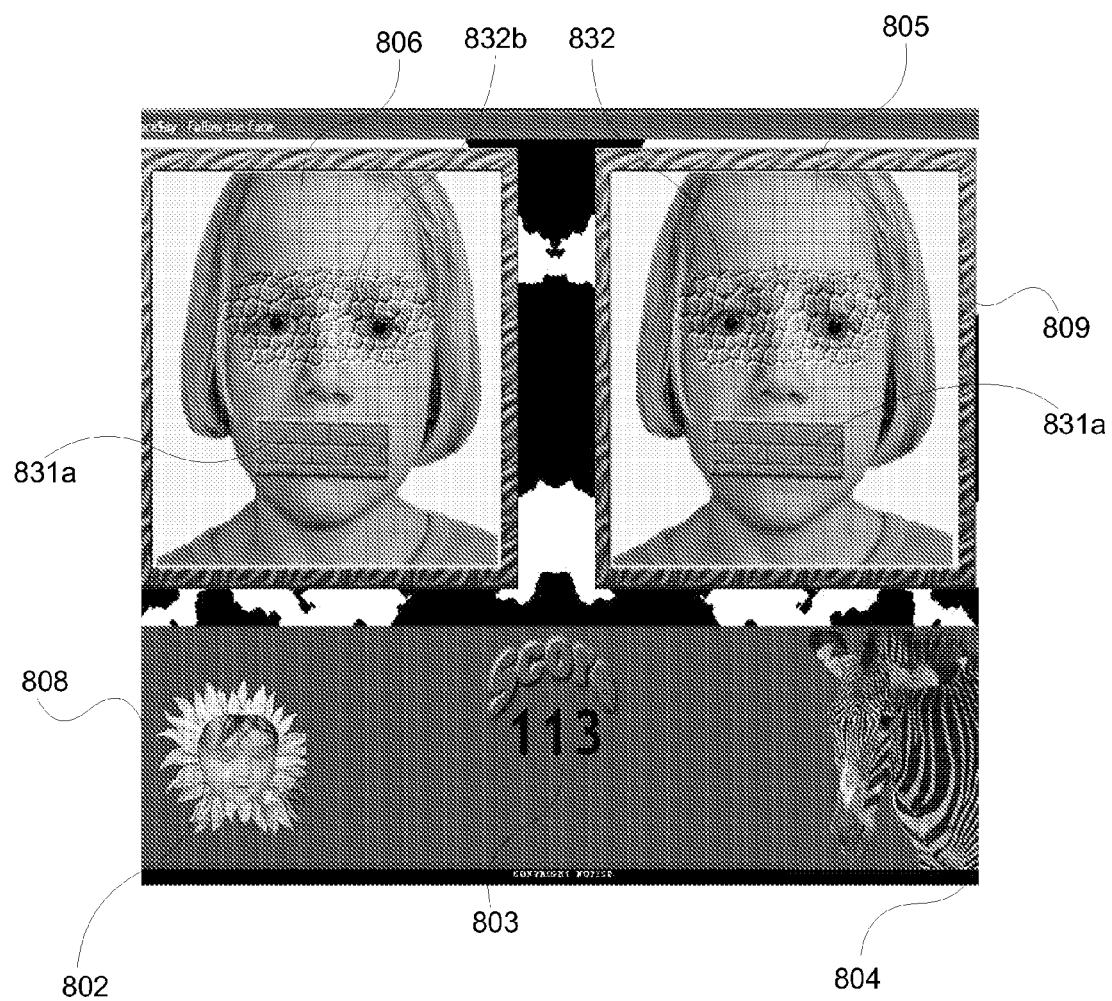
FIG. 10 is an image of a face with the image of a brick covering a mouth displayed during a game generated by the system shown in FIGS. 1 and 2.

FIG. 10 is an image of two faces 805, 806 with the image of a brick wall 831a covering mouths displayed during the third subroutine of the user interface of the system shown in FIGS. 1 and 2. The image is that of one of the latter stages of "Follow the Leader." The purpose of the brick image 831a is to visually block a portion of the image, the portion being a mouth. The brick wall 831a forms a structural mask, one that does not move with the skin, but moves as the facial structure moves. The brick wall 831a is used to hide the movements of a mouth. The user interface requests the user to animate the area around the eyes through clicking at a certain point on the image. The controller 100 then indicates to the user whether the user's animation of the image 806 was correct. If incorrect, the controller 100 requests the user to animate the image 806 again, until the user animates the image 806 correctly.

FIG. 11 is an image of a face with whiskers 831b covering eyes and a brick wall 831a covering a mouth on a face 806 displayed during the third subroutine of the user interface of the system shown in FIGS. 1 and 2. The purpose of the image 806 is to visually block a portion of the image, the portion being a non-animated mouth. The whiskers 831b also serve to partition or map a portion of the image into small high-value regions, such as the area beneath the eyes, above the eyes, and between the eyes. The whisker map can be optionally divided into a small number of contiguous sectors 831c, 831d, 831e, and 831f. The horizontal white line moves with the skin, which is both an amplifier, and when measured against the stationary lines, a quantifier. The user interface requests the user to animate the area around the eyes through clicking at a certain point on the image. The controller then indicates to the user whether the user's animation of the image was correct. If incorrect, the controller requests the user to animate the image again, until the user animates the image correctly.

FIG. 12 is an image of animation of the area around the eyes and brick walls covering the mouths on faces displayed during the third subroutine of the user interface of the system shown in FIGS. 1 and 2. FIG. 12 combines the elements of FIGS. 9, 10, and 11. In this portion of "Follow the Leader," the user is presented whiskers 831b and brick walls 831a covering two faces 805, 806. The whiskers 831b and brick walls 831a serve to minimize distraction for the user. The two images 805, 806 are located on the stage 809. A talking zebra 804 and baby 802 are located in the orchestra pit 808. The zebra 804 gives commands and feedback. The user's task is to animate the image 806 on the left to make it match the image 805 on the right. The whiskers 831b are also used to help visually quantify the movements of the skin and facial features in conjunction with a skin mask 832. The whiskers 831b map the areas around the eyes and divide the area into three contiguous sectors with partition lines 831c. After the user completes the animation, the controller indicates to the user whether the user's animation of the image was correct. If incorrect, the controller requests the user to animate the image again, until the user animates the image correctly.

Figure 13:
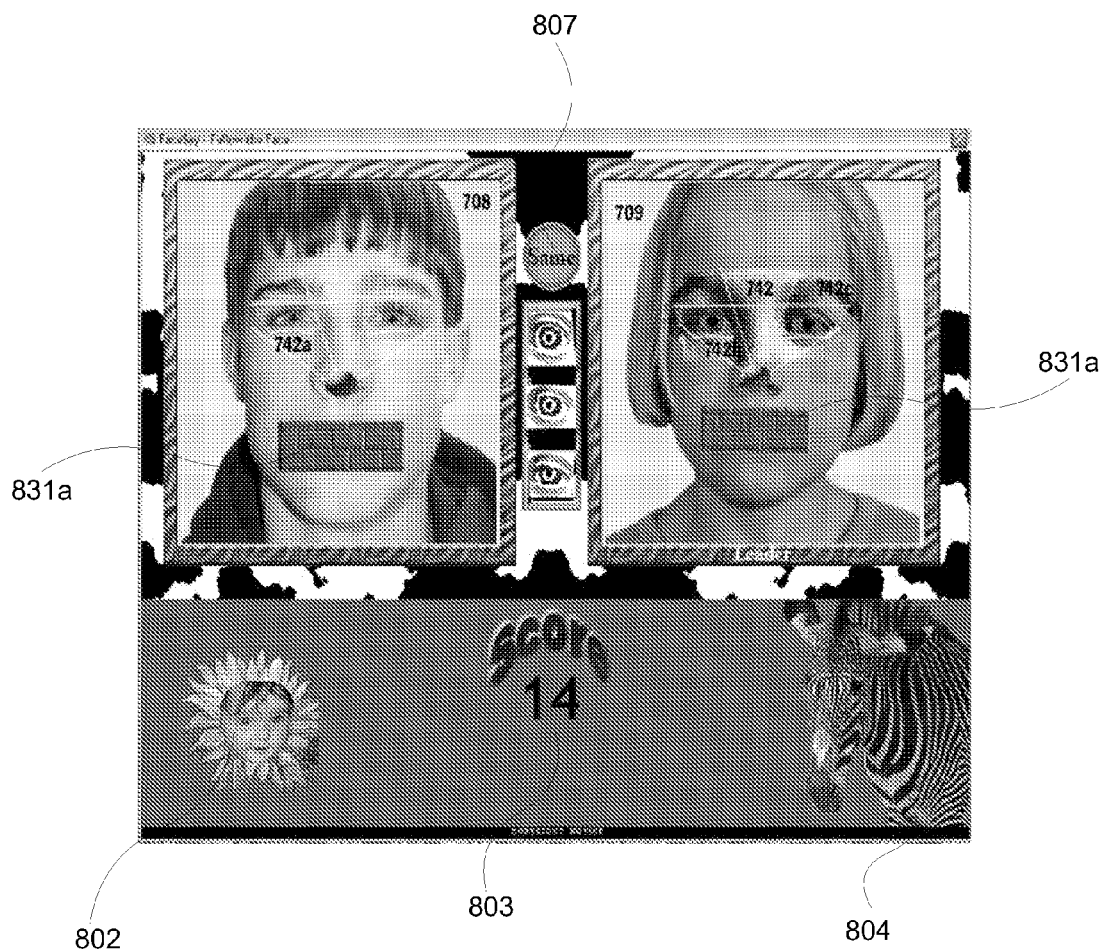
FIG. 13 is an image of faces with whiskers covering eyes and brick walls covering mouths displayed during a game generated by the system shown in FIGS. 1 and 2.

FIG. 13 is an image of animation of the area around the eyes and brick walls covering the mouths on faces displayed during the third subroutine of the user interface of the system shown in FIGS. 1 and 2. FIG. 12 combines the elements of FIGS. 9, 10, and 11. In this portion of "Follow the Leader," the user is presented with whiskers 831b and brick walls 831a covering two different faces 805, 806. The two images 805, 806 are located on the stage 809. A talking zebra 804 and baby 802 are located in the orchestra pit 808. The zebra 804 gives commands and feedback. The user's task is to animate the image 806 on the left to make it match the image 805 on the right. The whiskers 831b are also used to help visually quantify the movements of the skin and facial features in conjunction with a skin mask 832. The whiskers 831b map the areas around the eyes and divide the area into three contiguous sectors with partition lines 831c. After the user completes the animation, the controller indicates to the user whether the user's animation of the image was correct. If incorrect, the controller requests the user to animate the image again, until the user animates the image correctly.

While the user or student controls the game, the software produces the images that issue voice commands to the user. For all three games, the user must successfully complete the challenge, be it identifying the direction of the eyes (Amazing Gazing), filling in the blank with a facial feature (Bandaid), or determining and correcting any differences between two faces (Follow the Leader).

The software uses questions from a database and continually loops until the correct answer is inputted by the user. Hovering over the baby image allows the user to see how many questions remain in a session.

The invention increases awareness of small physical movements and promotes greater tolerance for and comfort with ambiguity in a social gesture or situation. The keen awareness of the human face helps the student modulate his or her own facial expressions. The user interface also uses software techniques to partially animate the image of a human face. The techniques and methods help the student become more aware of physical movements related to facial expressions, providing simulated and approximate eye contact as expected by another person. The system and method according to the present invention may be used by itself, or in conjunction with any number of known system and methods.

Figure 14A:
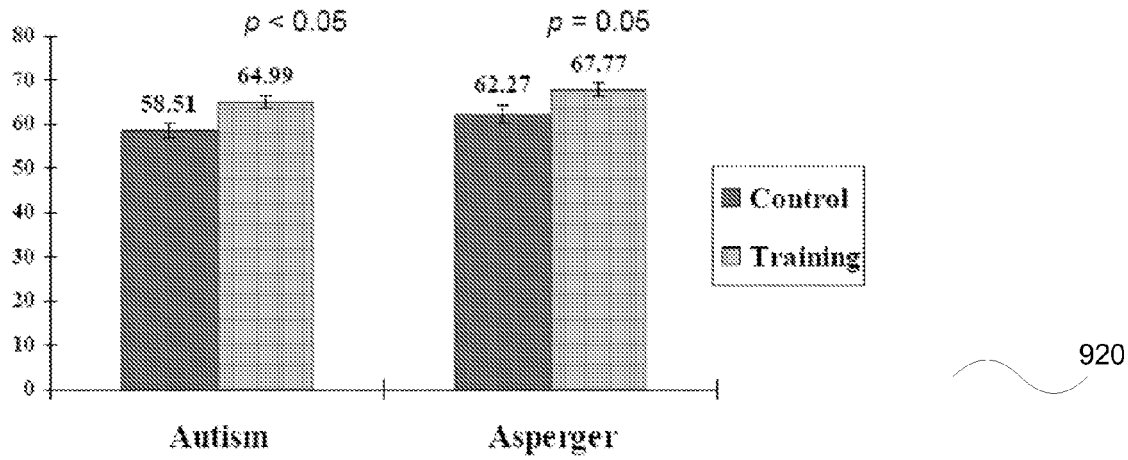
FIGS. 14A-14B are charts displaying data corresponding to social skills ratings and observations from a randomized controlled study of the present invention.
Figure 14B:
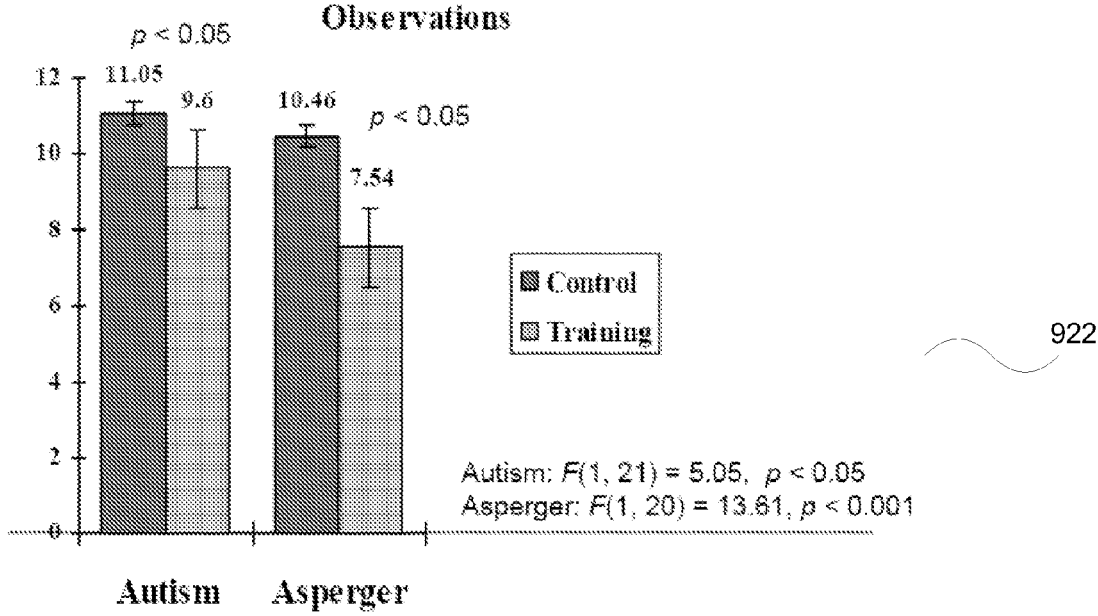

FIGS. 14A-14B are charts displaying data corresponding to social skills ratings and observations. The first chart 801 indicates the improvement of social skills ratings given training. The "control" bars indicate the parent-reported social skills at home, while the "training" bars indicate the results after playing games according the present invention. Higher scores show improvement. The second chart 802 indicates the improvement of observed social skills given training. The "control" bars indicate observed social skills in the classroom, while the "training" bars indicate results after playing the games. Here, lower scores show improvement. The present invention aims to improve both ratings and observations of individuals afflicted with learning disorders.

Although the invention has been described with reference to a particular arrangement of parts, features and the like, these are not intended to exhaust all possible arrangements or features, and indeed many modifications and variations will be ascertainable to those of skill in the art.

What is claimed is:

1. A method to improve social skills and feature recognition, said method comprising the steps of:
   providing an image of a face;
   visually amplifying one or more first portions of the image via software executing on a computer;
   visually partitioning one or more second portions of the image via software executing on the computer;
   visually quantifying one or more portions of the image via software executing on the computer;
   displaying the image;
   animating at least one of the first and second portions of the image via software executing on the computer to simulate a facial movement of facial features located therein; and
   receiving a user response indicative of the user's perception of the facial movement.

2. The method according to claim 1, further comprising the steps of:
   displaying questions for the user;
   providing instructions and hints on the questions and their social value;
   receiving a response from the user;
   verifying the accuracy of the response;
   producing output as to whether the response was correct;
   requesting the user to enter input again if the response was incorrect; and
   advancing to the next question if the response was correct.

3. The method according to claim 2, wherein the face is a human face.

4. The method according to claim 2, further comprising the step of:
   progressing from a predictable environment to a realistic and uncontrolled environment of physical details; and
   incorporating patterns applicable to as yet un-encountered occurrences of the physical details.

5. The method according to claim 2, further comprising the step of:
   removing the partitioning via software executing on the computer;
   animating another one of the first and second portions via software executing on the computer; and
   receiving a second user response indicative of the animated portion.

6. The method according to claim 2, further comprising the step of:
   visually blocking a third portion of the image via software executing on the computer, the third portion being a non-animated portion.

7. The method according to claim 2, wherein the image is an electronic image.

8. The method according to claim 7, further comprising the step of:
   physically reenacting the step of animating; and
   receiving a user response indicative of the physically animated portion.

9. The method according to claim 2, further comprising the step of:
   issuing feedback to the user corresponding the user's actions; and
   looping to the start of a game question until the user to successfully complete said game question.

10. The method according to claim 2, further comprising:
    transmitting feedback to the user indicative of the accuracy of the user's perception.

11. The method according to claim 2, further comprising the steps of:
    altering the onscreen locale of the animated portion;
    receiving a user response indicative of the user's perception of the onscreen locale of the animated portion; and
    transmitting feedback to the user indicative of the accuracy of the user's perception.

12. The method according to claim 2, further comprising the step of:
    visually amplifying a portion of said image of a face via software executing on the computer; and
    altering and animating a portion of said image of a face.

13. The method according to claim 2, further comprising the step of:
    visually amplifying a portion of said image of an eye via software executing on the computer; and
    altering and animating a portion of said image of an eye.

14. The method according to claim 2, further comprising the step of:
    engaging the user in a game wherein the user selects a spot on the screen representative of said animated image.

* * * * *